(12) United States Patent
Dunstan et al.

(10) Patent No.: US 7,698,584 B2
(45) Date of Patent: *Apr. 13, 2010

(54) METHOD, APPARATUS AND SYSTEM FOR ENABLING A NEW DATA PROCESSING DEVICE OPERATING STATE

(75) Inventors: Robert A. Dunstan, Forest Grove, OR (US); Dan H. Nowlin, Hillsboro, OR (US); Clifton W. Laney, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/287,862

(22) Filed: Oct. 14, 2008

(65) Prior Publication Data

US 2009/0044109 A1 Feb. 12, 2009

Related U.S. Application Data

(63) Continuation of application No. 10/644,978, filed on Aug. 19, 2003, now Pat. No. 7,447,918.

(51) Int. Cl.
*G06F 1/32* (2006.01)
(52) U.S. Cl. ...................... 713/300; 713/320
(58) Field of Classification Search ............... None
See application file for complete search history.

(56) References Cited

U.S. PATENT DOCUMENTS 5,537,656 A 7/1996 Mozdzen et al.
(Continued)

FOREIGN PATENT DOCUMENTS

CN 1125333 A 6/1996
(Continued)

OTHER PUBLICATIONS

Intel Corporation, Instantly Available Power Managed Desktop PC Design Guide, Revision 1.2, Sep. 25, 1998, pp. 1-64.
(Continued)

*Primary Examiner*—Dennis M Butler
(74) *Attorney, Agent, or Firm*—Sharmini N. Green

(57) ABSTRACT

A method, apparatus and system to enable a data processing device to operate while seemingly "off". According to one embodiment, a data processing device is configured to recognize a new system state, i.e., Visual Off. On such a data processing device, when the power button is pressed, the request to turn off the device is intercepted by a module and the device is transitioned to a Visual Off state. To the user, this transition appears instantaneous. During the transition, audible and visual indicators on the data processing device and on human interactive devices ("HID devices") coupled to the data processing device may be turned off and/or disabled. While in the Visual Off state, the device may be fully operational, or in an alternate embodiment, the device may be placed in a low power state. When the user presses the power button again to "wake up" the data processing device, the device may transition from Visual Off into an "on" state ("Visual On"), i.e., all audible and visual indicators on the data processing device and HID devices coupled to it may be turned back on and/or enabled.

15 Claims, 5 Drawing Sheets

U.S. PATENT DOCUMENTS

| | | |
|---|---|---|
| 6,269,444 B1 | 7/2001 | Aguilar et al. |
| 6,560,713 B1 | 5/2003 | Chary |
| 6,654,896 B1 | 11/2003 | Saunders et al. |
| 6,823,460 B1 | 11/2004 | Hollander et al. |
| 7,447,918 B2 * | 11/2008 | Dunstan et al. ............. 713/300 |
| 2004/0019906 A1 | 1/2004 | Shintani et al. |
| 2004/0225901 A1 | 11/2004 | Bear et al. |
| 2005/0120345 A1 | 6/2005 | Carson |

FOREIGN PATENT DOCUMENTS

| | | |
|---|---|---|
| EP | 0635778 A2 | 1/1995 |
| JP | 10-301674 | 11/1998 |
| JP | 11-167439 | 6/1999 |
| JP | 2000-20185 | 1/2000 |
| JP | 2003-223246 | 8/2003 |

OTHER PUBLICATIONS

PCT International Search Report, dated Apr. 13, 2005 International Application No. PCT/US2004/026402/International Filing Date Aug. 13, 2004 (16 pages).

Microsoft "OnNow Pow.Mgmt. Architecture for Applications" Online, Jul. 24, 2003, XP 002322895, Retrieved from the Internet: URL:http://web.archive.org/web/20030724080450/http://www.microsoft.com/whdc/hwdev/tech/onnow/onnowapp.sub.—Print.mspx>, retrieved on Mar. 31, 2005 (3 pages).

Microsoft, OnNow Device Power Management, Dec. 4, 2001, pp. 1-7, down loaded from www.microsoft.comlwhdc/system/pnppwr/powermgmt/devicepm.mspx.

David C. Stewart, Software to Deliver Ease of Use to Internet Users, Intel Developer update Magazine, Sep. 2000, pp. 1-6.

AMD, Power Management Specification for Network Devices Enables Sleeping PCs to Maintain their Network Connection, Mar. 1997, pp. 1-3, down loaded from www.amd.com/us-en/CorporateVirtualPressRoom/0,,51.sub 104.sub 5-43.sub.-.555.about-967,00.html.

International Preliminary Report on Patentability for Patent Application No. PCT/US2004/026402, mailed Mar. 2, 2006, 11 pages.

* cited by examiner

METHOD, APPARATUS AND SYSTEM FOR ENABLING A NEW DATA PROCESSING DEVICE OPERATING STATE

FIELD

This application is related and claims priority to U.S. patent application Ser. No. 10/644,978 titled "Method, Apparatus and System for Enabling a New Data Processing Device Operating State," which was filed on Aug. 19, 2003 which is entirely incorporated by reference. The present invention relates to the field of computing, and more particularly, to a method, apparatus and system for enabling a data processing device to continue operating after a user has seemingly shut down the device.

BACKGROUND

Personal computer ("PC") characteristics and behavior are typically predicated on the user's presence in the vicinity of the device. For example, error messages and/or interactive questions may be displayed on the display devices coupled to the PC, with the expectation that the user is present to respond. Machines designated as servers, on the other hand, typically operate with no one in attendance. Server messages, for example, may be written to a log file accessible remotely by the server administrator. Servers are often referred to as operating "headless" since they may have no human interface device ("HID device") such as a mouse, keyboard and/or monitor attached locally.

Recently, the notion of a "digital home" has become more prevalent. At the core, the digital home vision contemplates various devices within a home (e.g., consumer electronic devices, PCs, etc.) interconnected and integrated seamlessly on a network. Within this environment, at least one device (e.g., a PC), may host and manipulate content accessible by other devices on the network. In other words, as currently contemplated, these digital home environments may include PCs that operate as servers, i.e., with the user being mostly absent. FIG. 1 illustrates an example of a digital home environment within which PC 100 may act as a server that interacts with Devices 105, 110, 115, 120 and 125 on a digital home Network 150 without any user interaction. Most PC users, however, will continue to expect their PCs to behave like traditional PCs, both when the PCs are turned on and when they are turned off. Thus, for example, when a user turns off his PC, he expects the machine to power down. If powered down, however, the PC may not process any requests, i.e., it may not act as a server.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
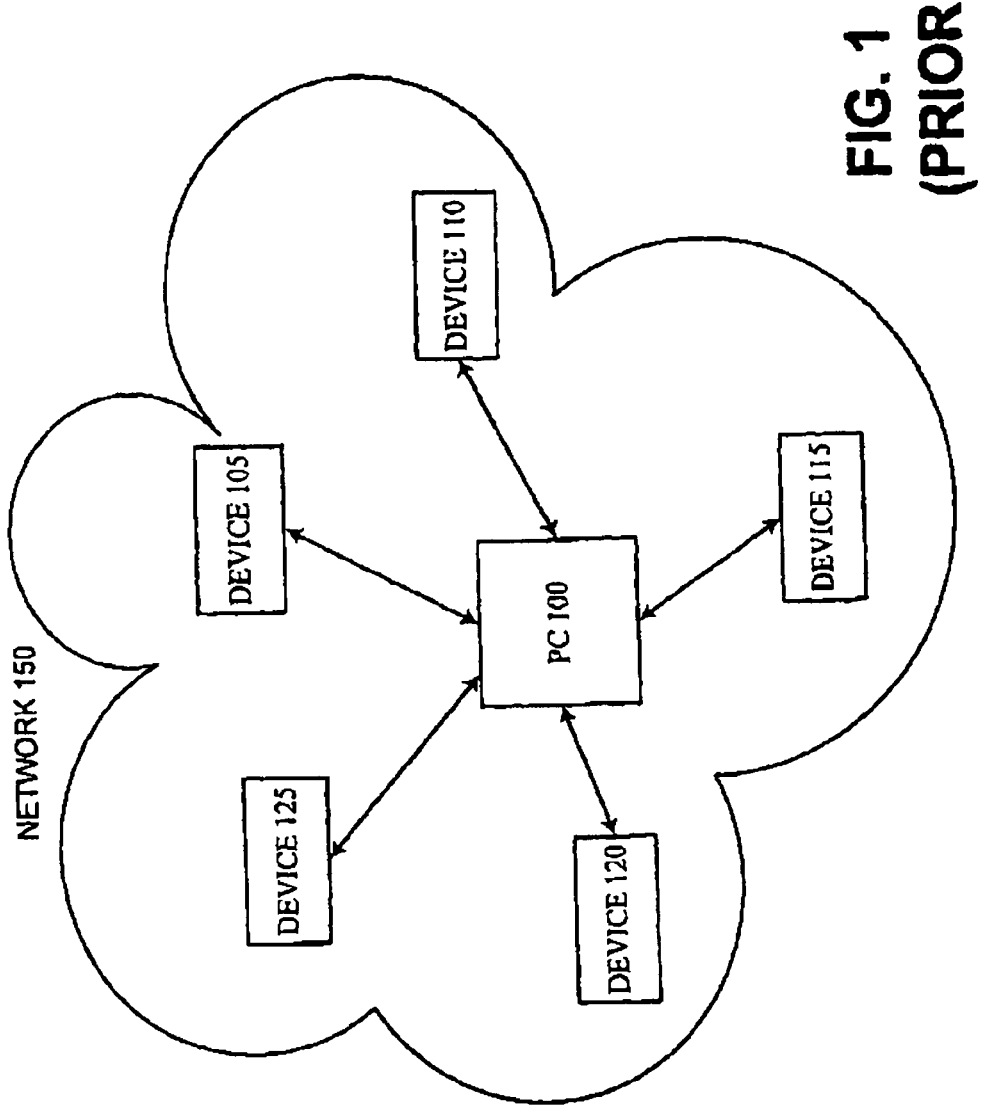
FIG. 1 illustrates a typical digital home environment.

Embodiments of the present invention provide a method, apparatus and system for enabling a data processing device to continue operating while seemingly powered down. Reference in the specification to "one embodiment" or "an embodiment" of the present invention means that a particular feature, structure or characteristic described in connection with the embodiment is included in at least one embodiment of the present invention. Thus, the phrases "in one embodiment", "according to one embodiment" or the like appearing in various places throughout the specification are not necessarily all referring to the same embodiment.

The following description assumes that the data processing devices are operating within a networked environment such as a digital home environment. Various details of the digital home environment (e.g., the configuration, the physical network and communications protocols, etc.) are irrelevant to the scope of embodiments of the present invention and are therefore omitted herein. For the purposes of this specification, it is pertinent only that these environments contemplate using a central data processing device that operates as a server, to host content, and/or to interact with and service requests from various other devices coupled to the server via a network. If the central data processing device is a PC, for example, these PCs must be available to operate as servers even after the user has turned off his PC. It will be readily apparent to those of ordinary skill in the art that embodiments of the present invention may also be applicable to and/or implemented in other networked environments wherein a central data processing device may service requests from other devices.

Additionally, embodiments of the present invention may also be implemented in various non-networked environments, e.g., where a PC equipped with Windows™ Media Center Edition is configured to digitally record television programs to the PC's hard disk. The PC may be coupled to an antenna, satellite and/or cable to receive the television transmissions, i.e., the PC is not "networked" in the traditional sense of the word, but is capable of receiving content nonetheless. Thus, although the term "digital home" and/or "digital home environments" may be used herein for simplicity, embodiments of the present invention shall not be limited to such environments and shall include any networked environment and/or non-networked environment.

According to embodiments of the present invention, data processing devices (hereafter collectively referred to as "PCs") may be configured to include and/or recognize a new operating "state" (hereafter referred to as "Visual Off") in which the device appears to the user to be powered off, but wherein the device is actually capable of processing requests. The concept of "states" is described in further detail below. The Visual Off state essentially convinces users that their PCs are off by appearing to act as users typically expect when they turn off their machines. In reality, however, the PCs may still be operating and be available to process requests (e.g., local requests and/or requests from other devices coupled to the PC). In this manner, users may continue using their PCs as familiar desktop processing devices while the PC is on, and the PC may continue to be available to process requests although seemingly powered down. This new state (i.e., Visual Off) is described in further detail below. It will be readily apparent to those of ordinary skill in the art that although this specification describes the Visual Off state with respect to a server running in a digital home environment, embodiments of the invention are not so limited. Instead, Visual Off may be implemented as a feature of any and/or all data processing devices, regardless of whether these devices are designated as servers within the digital home and/or other networked or non-networked environments.

The following description of the Visual Off state assumes that a PC is running an Advanced Configuration and Power Interface ("ACPI") compliant operating system, but embodiments of the present invention are not so limited. The following description of ACPI-compliant operating systems is therefore merely exemplary and not limiting. ACPI Revision 2.0b (Oct. 11, 2002) is an open industry standard specification for a power management scheme. The pertinent ACPI system states include S0 ("on"), S1 and S2 (also "on" but in a lower power state than S0), S3 ("suspend to memory"), S4 ("hibernate" and/or "suspend to hard disk") and S5 ("soft off"). The three former states (S0, S1 and S2) may hereafter be referred to as the "on" states while the latter three states (S3, S4 and S5) may be referred to as the "off" states. The various characteristics of each state are well known to those of ordinary skill in the art and further description thereof is omitted herein in order not to unnecessarily obscure the present invention. Additionally, it will be apparent to those of ordinary skill in the art that in order for PCs to recognize the ACPI functionality described herein, certain modifications may be implemented in the PC's hardware (e.g., the system motherboard) and/or firmware (e.g., the PCs Basic Input/Output System or "BIOS"). Details of such modifications are implementation specific and will be readily apparent to those of ordinary skill in the art. Furthermore, although embodiments of the invention are described herein according to ACPI-specific terminology, it will be readily apparent to those of ordinary skill in the art that various embodiments of the invention may be implemented on operating systems compliant with other power management schemes and/or that aspects of various embodiments may be implemented in hardware, software, firmware and/or a combination of the above.

In one embodiment, PCs may be configured to enter a Visual Off state when a user presses the soft power button to turn off his PC. Thus, for example, when the user presses the PC's power button to turn it off, the PC (including the HID devices coupled to it) may appear to turn off immediately. From the user's perspective, the PC appears to bypass the extended shutdown or suspend procedures that are currently used, and instead, may appear to turn off immediately. When the user presses the power button again to turn the PC on, the PC (including the HID devices coupled to it) appears to start up rapidly (i.e., go from "Visual Off" into a "Visual On" state), without the typical startup messages and without a lengthy delay. Thus, from the user's perspective, Visual Off and Visual On essentially provide the user with a simplified, intuitive, user-friendly method of turning his PC "off" and "on." Although the above description assumes that the power button resides on the PC, in various embodiments, the power button for the purposes of embodiments of the present invention may also include a button on the keyboard and/or the display device coupled to the PC, and/or a button on an infrared remote control device capable of transmitting requests to the PC (e.g., similar to a television remote). Thus, any reference herein to a "power button" shall include all of the above and/or any other means of transmitting a command to a PC.

Additionally, in alternate embodiments, a PC may be configured to transition to Visual Off and/or Visual according to predetermined criteria. Thus, for example, the PC may be configured to turn "on" and "off" based on the user's presence and/or absence near the PC. In this scenario, instead of requiring an action by the user (e.g., by the user actively pressing a power button), input from various devices (including finger-print/eye retina scanners, active badges, and/or face recognition cameras) may be used to determine when to transition the PC to Visual Off and/or Visual On. For example, based on input from a face recognition camera, PC 100 may determine that the user is not located near the PC, and in one embodiment, the PC may be configured to transition to "Visual Off" accordingly. In alternate embodiments, PC 100 may be configured to transition to a Visual Off state after a predetermined period of inactivity (e.g., no keyboard and/or mouse activity detected on PC 100). It will be readily apparent to those of ordinary skill in the art that PC 100 may be configured in a variety of ways (alone or in combination) to transition to Visual Off and/or Visual On without departing from the spirit of embodiments of the present invention. Reference to "pressing a power button" herein shall therefore not be limited only to affirmative actions by the user and shall instead include other methods of instructing PC 100 to transition to Visual Off and/or Visual On (e.g., using input from devices and/or setting a predetermined time threshold, as described above).

Figure 2:
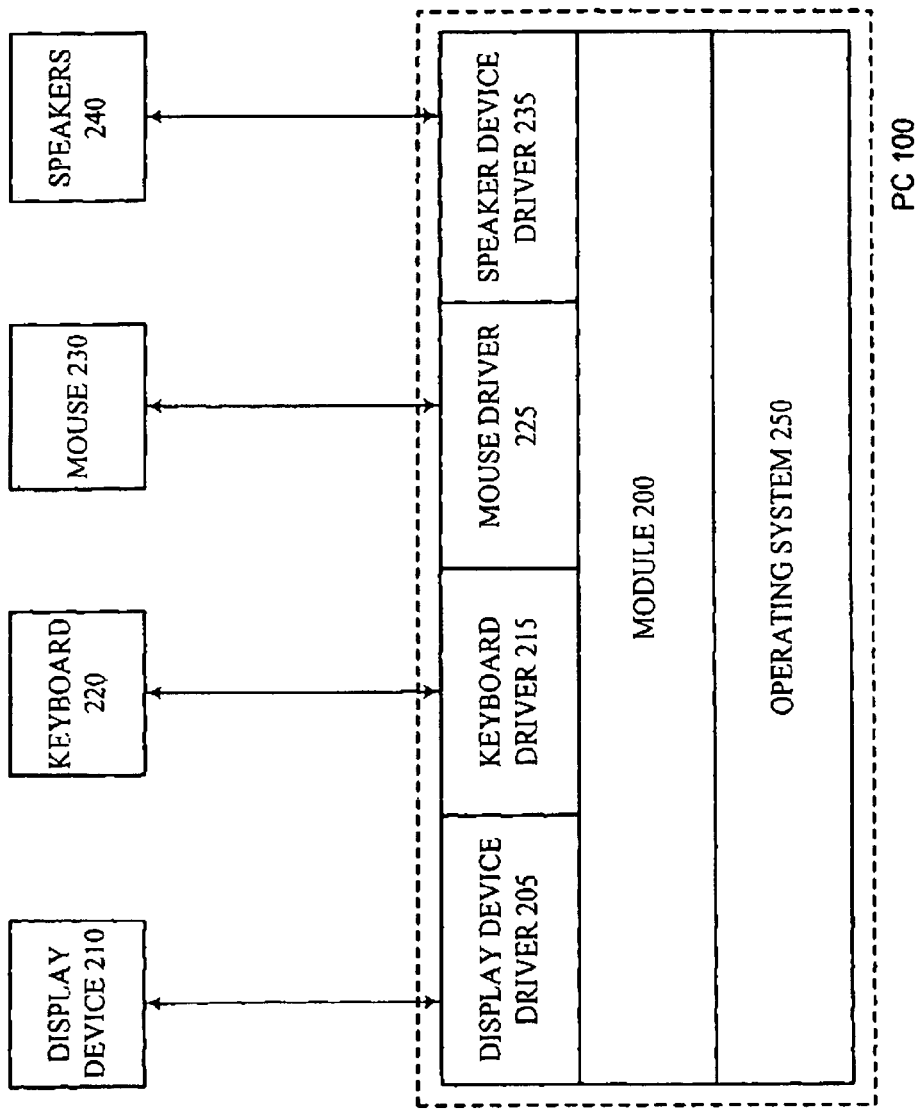
FIG. 2 illustrates a conceptual embodiment of the present invention.

FIG. 2 illustrates conceptually an embodiment of the present invention wherein PC 100 is configured with Visual Off capabilities. In order to achieve the Visual Off state, Operating System 250 on PC 100 continues to function, but from the user's perspective, a variety of HID devices may appear to shut down. In order to provide users with the illusion of turning off PC 100, all audible and visual indicators on the PC and various HID devices may be turned off. To accomplish this goal, in one embodiment, all lights (light emitting diodes (LEDs), etc.) on the front and/or back panel of PC 100 are turned off and one or more display device(s) coupled to the PC may also appear to be turned off (the visual display(s) as well as the lights (LEDs, etc) on the display(s)). Additionally, any keyboard and/or mouse attached to the PC may also be disabled and visual indicators on the keyboard and/or mouse may be turned off (e.g., the LEDs on the keyboard). All audible alerts in the PC may also be turned off (e.g., by turning off the speakers).

As illustrated conceptually in FIG. 2, in one embodiment, a module (Module 200) is loaded onto PC 100 to enable PC 100 to enter into a Visual Off state. Although the following description assumes that Module 200 is a software driver, it will be readily apparent to those of ordinary skill in the art that Module 200 may be implemented in software, hardware, firmware and/or any combination thereof without departing from the spirit of embodiments of the present invention. In one embodiment, if Visual Off is configured on PC 100 (e.g., Module 200 is loaded into PC 100's memory), when Module 200 detects that the power button is pressed, it may instruct various devices to shut down/turn off (e.g., via the device drivers for each device). For example, Module 200 may send a signal to hardware on PC 100 (e.g., logic in PC 100's chipset and/or ancillary logic (e.g., system input output or "SIO") that controls LED drivers and/or input/output lines) to change the state of an input/output line that turns off the lights on the front and back panels of PC 100.

Additionally, Module 200 may send a signal to Display Device Driver 205 to tell it to change the state of Display Device 210 (e.g., to go from an ACPI "D0" to "D3" state), thus blanking the display. Similarly, Module 200 may disable all inputs to Keyboard 220 and Mouse 230 and mute all audio signals to Speakers 240 via the respective device drivers for each device, Keyboard Driver 215, Mouse Driver 225 and Speaker Driver 235. It will be readily apparent to those of ordinary skill in the art that although the above description contemplates Module 200 interacting with various devices via device drivers, in alternate embodiments, these devices may be shut down in a variety of other ways (e.g., by directly accessing the device hardware and altering their states).

It is important to note that although from the user's perspective, the Visual Off state resembles the "off" states in that all visual and audible indicators on the PC are off, these states are in fact significantly different. Specifically, while in the Visual Off state, the PC may remain "on" and the operating system may continue to be capable of processing requests. In one embodiment, after a predetermined period, the operating system may transition the PC to a lower power state (S3 or S4). In other words, while in Visual Off, the PC may transition from an "on" state to an S3 or S4 state, and transition back to an "on" state upon receipt of an incoming request. Since the PC is still in Visual Off during these transitions, however, all audio and visual indicators on the PC may remain off, and thus, from the user's perspective, the PC remains off.

In contrast, if a PC is not configured with Visual Off, it may still transition to an S3 or S4 state and the PC may power down. In the absence of Visual Off, the PC is essentially off and unable to process requests, although the PC may include mechanisms to "wake up" the system, e.g., if there is an embedded controller on the PC Local Area Network card, for example, that snoops packets and wakes the PC out of S3 or S4 when it sees predefined bit patterns in an incoming packet. Significantly, however, in the absence of Visual Off, when the PC transitions back from an S3 or S4 state to an "on" state, the PC and all HID devices coupled to the PC will be turned on. In other words, all audible and/or visible indicators on the PC and HID devices coupled to the PC will be turned back on when the PC is reactivated to process a request. This behavior is undesirable within a digital home environment where users are unlikely to want any visual indicators and/or audible messages emitting from their PCs when they believe their PCs are "off" (e.g., in the middle of the night).

Figure 3:
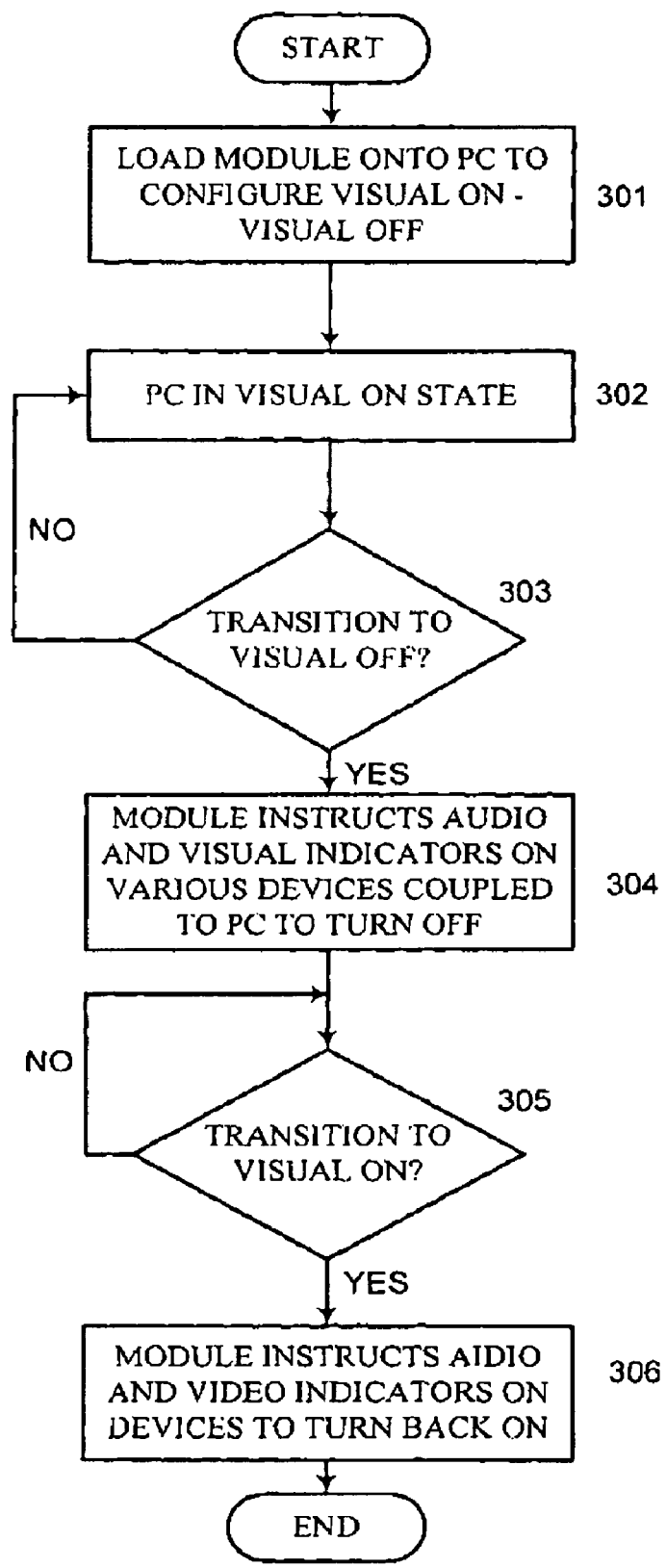
FIG. 3 is a flow chart illustrating an overview of an embodiment of the present invention.

FIG. 3 is a flow diagram illustrating an overview of an embodiment of the present invention. This diagram illustrates the process of causing PC 100 to enter into a Visual Off state and then return to a Visual On state. Although the following operations may be described as a sequential process, many of the operations may in fact be performed in parallel or concurrently. In addition, the order of the operations may be re-arranged without departing from the spirit of embodiments of the invention. In 301, Module 200 is loaded onto the PC to configure Visual On-Visual Off for PC 100. Module 200 monitors PC 100 to determine whether PC 100 has been instructed to transition to Visual Off. Thus, in 302, PC 100 may either continue to process requests in a Visual On state or, if PC 100 receives an instruction (via the user pressing the power button) to transition to the Visual Off state in 303, Module 200 may turn off audible and/or visible indicators on various HID devices in 304.

It will be readily apparent to those of ordinary skill in the art that the extent to which these HID devices may be shut down may differ from one embodiment of the invention to another. Thus, for example, although in one embodiment, audible and visible indicators on all HID devices coupled to the PC may be turned off, in an alternate embodiment, only a subset of the indicators may be turned off. In 305, Module 200 may continue to monitor PC 100 and if it detects that the user has pressed the power button again, to transition PC 100 into an Visual On state, then in 306, Module 200 may reactivate the audio and video outputs of the HID devices coupled to PC 100 (including turning on the lights on the front and back panels of PC 100).

Figure 4:
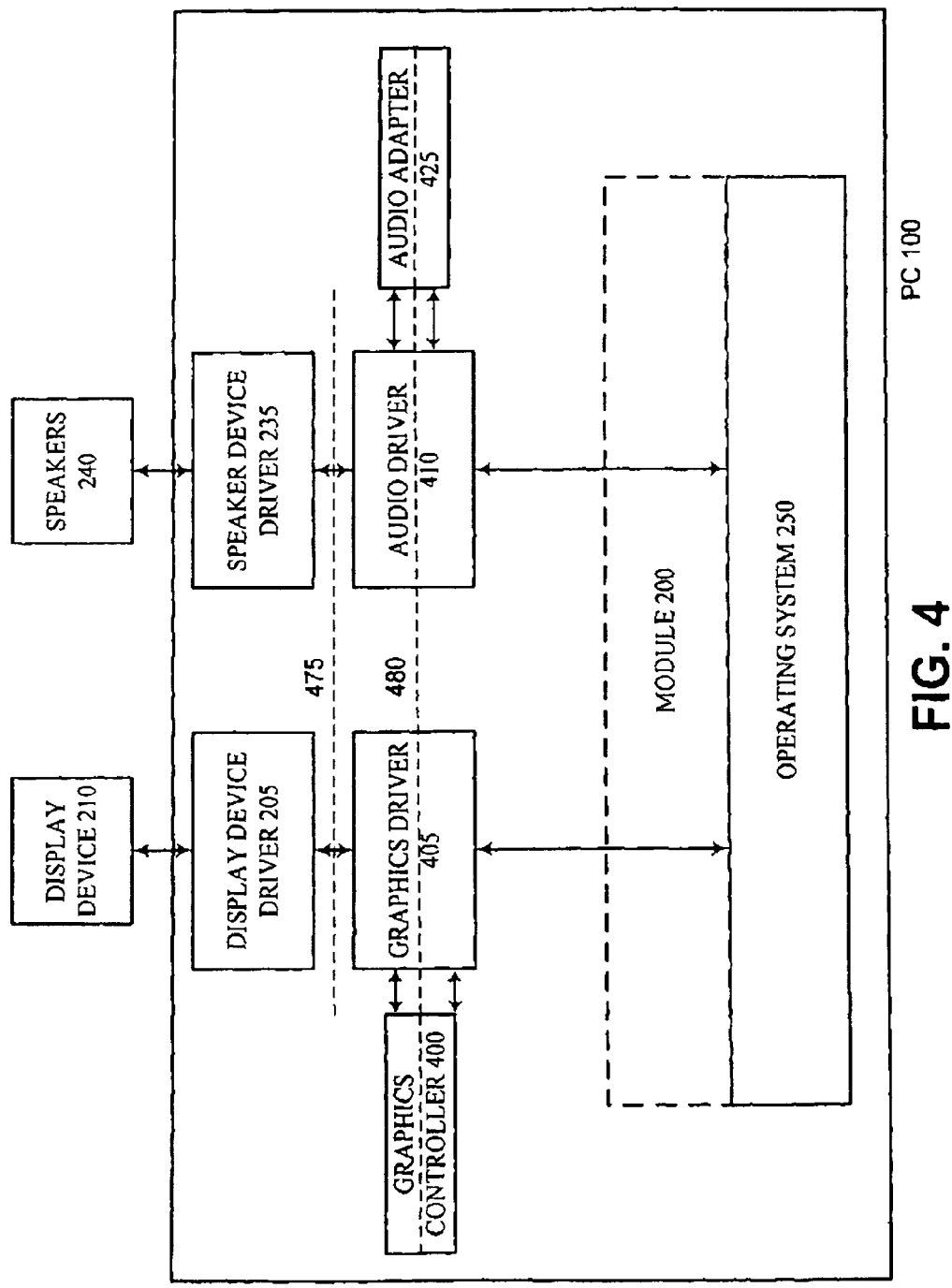
FIG. 4 illustrates an example of the system in FIG. 2 implementing power savings according to an embodiment of the present invention.

In one embodiment of the present invention, since the HID devices coupled to PC 100 are essentially unnecessary in a Visual Off state (e.g., the display is blanked, the audio is muted and/or the keyboard and/or mouse are disabled), the processes that generate output to those devices may be turned off altogether to reduce power consumption. In one embodiment, Operating System 250 may transition PC 100 into an "off" state while in Visual Off, and the computation processes that generate output to the HID devices may be turned off. Alternatively, the PC may remain in an "on" state in "Visual Off" but the computation processes that generate output to the HID devices may nonetheless be turned off to reduce power consumption. FIG. 4 illustrates an example of a system implementing power savings according to an embodiment of the present invention. More specifically, FIG. 4 illustrates the system of FIG. 2 in further detail. As illustrated, for example, instead of simply preventing graphics from being displayed on Display Device 210 (e.g., by instructing Display Device Driver 205 to change the state of Display Device 210 from an ACPI "D0" to "D3" state), a portion of the graphics engine on PC 100 (e.g., the computation portion of Graphics Controller 400) may also be turned off. In one embodiment, the respective driver for the Graphics Controller (illustrated as "Graphics Driver 405") may shut down the Graphics Controller 400 and intercept messages from Operating System 250 to Graphics Controller 400. In one embodiment, Graphics Driver 405 may intercept all messages from the operating system, while in an alternate embodiment, Graphics Driver 405 may process certain messages and store the rest. Although the following description assumes that Graphics Driver 405 performs this shutdown, interception and storing, in alternate embodiments, Module 200 may perform these functions instead.

Thus, in one embodiment, Operating System 250 may continue to send messages to Graphics Controller 400 via Graphics Driver 405 and believe that the controller is processing these instructions and providing graphics output to Display Device 220. In reality, although Graphics Driver 405 enables the interface between Graphics Controller 400 and Operating System 250 to remain alive, the portions of Graphics Controller 400 that perform computations may be turned off. Graphics Driver 405 intercepts and stores the communications from Operating System 250, thus enabling these portions of Graphics Controller 400 to remain off without interrupting Operating System 250's functionality and/or belief that the Display Device 220 is operating properly. In other words, Operating System 250 may continue to function and interact with the "virtual" graphics subsystem (i.e., portions of the graphics driver and/or graphics controller), unaware that certain portions of Graphics Controller 400 are off. It will be readily apparent to those of ordinary skill in the art that this virtual graphics subsystem may be implemented in other ways without departing from the spirit of embodiments of the present invention. Given that generating graphics consumes a large amount of system resources, turning off the computation that generates graphics may realize significant power savings. Similarly, in another example, the portions of the audio engine on PC 100 (typically Audio Adapter 425 (sound card) that generates audio for the system) may be turned off altogether to conserve power on PC 100. In this embodiment, Audio Driver 410 intercepts and stores communications between Speaker Device Driver 235 and Audio Adapter 425. Although audio generation consumes less system resources than graphics generation, this nonetheless provides PC 100 with additional power savings when audio is unnecessary. Again, it will be readily apparent to those of ordinary skill in the art that this "virtual" audio subsystem (i.e., audio driver and/or audio adapter) may be implemented in other ways without departing from the spirit of embodiments of the present invention.

In one embodiment, in order for the above-described scenario to be completely transparent to Operating System 250, Graphics Driver 405 and/or Audio Driver 410 may save and resubmit at least one or more previous requests and/or messages from Operating System 250 to the HID devices. These requests may be saved in the respective controllers and/or adapters (e.g., in memory on these devices), and/or saved to a location on PC 100 (e.g., PC 100's memory and/or hard disk). Thus, for example, when PC 100 is transitioned back to Visual On, the respective HID devices may turn back on, and since Graphics Driver 405 and/or Audio Driver 410 intercepted the requests and/or messages from Operating System 250 to these devices, in one embodiment, this saved information may be used to restore the HID devices to the state the operating system believes the devices are in. Thus, for example, if Operating System 250 has issued instructions A, B and C to Graphics Controller 400, one or more of these instructions may be "saved" by Graphics Driver 405 and executed when PC 100 is transitioned back to a Visual On state, along with turning on the computation portions of Graphics Controller 400. Thereafter, from Operating System 250's perspective, Graphics Controller 400 will be in the state that Operating System 250 believes it to be, i.e., having executed A, B and C. Operating System 250 may thus continue to interact with the HID devices without any awareness that the HID devices were temporarily transitioned to a lower power state and/or turned off. It will be readily apparent to those of ordinary skill in the art that this technique of "dynamic device removal" (i.e., removing devices dynamically when they are not necessary for the system) may realize significant power savings. It will be additionally be apparent to those of ordinary skill in the art, however, that Visual Off may be implemented regardless of the above-described reduced power consumption techniques without departing from the spirit of various embodiments of the present invention.

Figure 5:
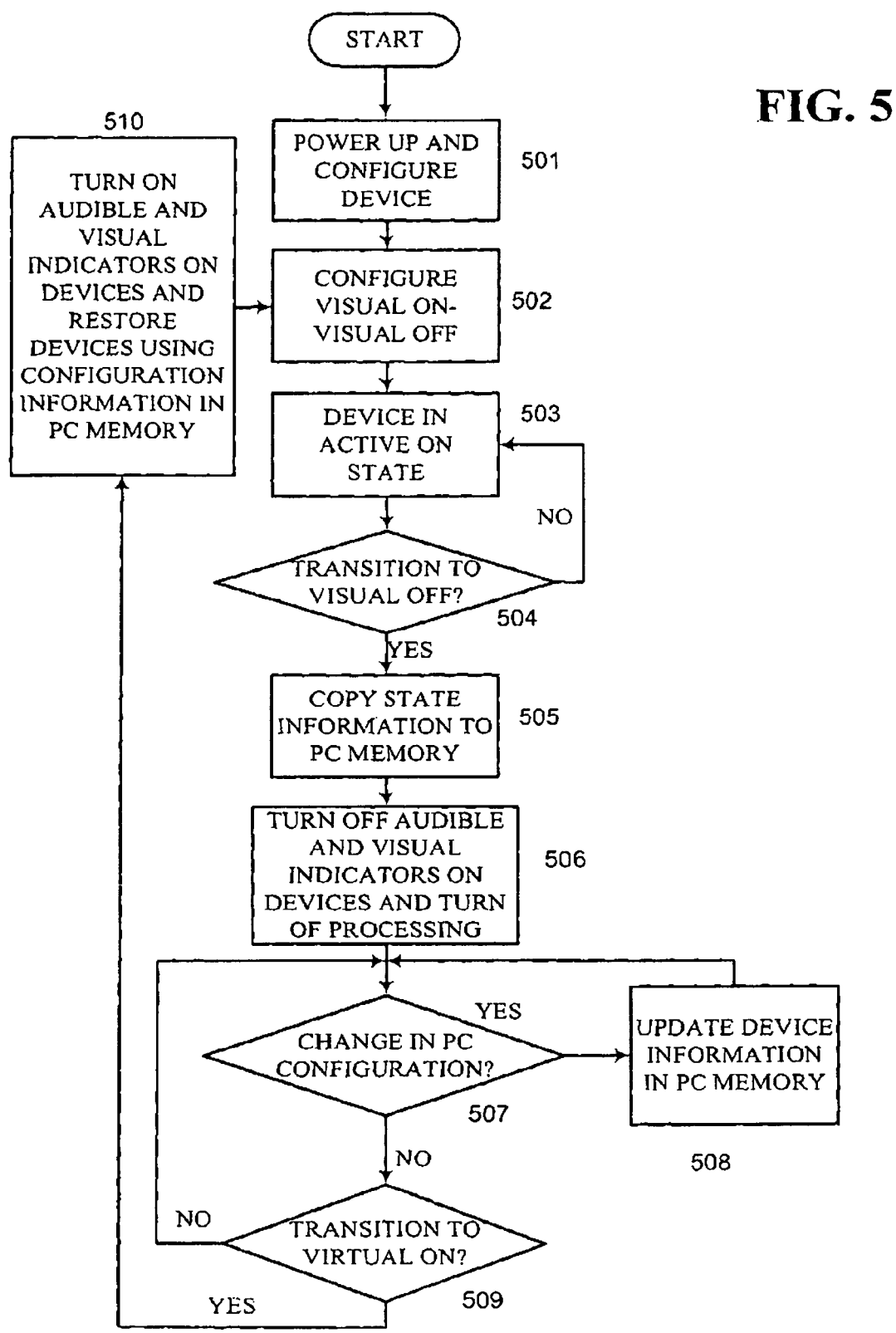
FIG. 5 is a flow chart illustrating an embodiment of the present invention.

FIG. 5 is a flow chart illustrating an embodiment of the present invention including the power savings technique described above, when PC 100 transitions from an "on" state, to a Visual Off state, and back again to a Visual On state. As illustrated, in 501, when PC 100 is booted up, it performs various initialization tasks such as powering up and configuring PC 100 and all coupled devices. Visual Off and Visual On are configured on PC 100 in 502 (e.g., Module 200 is loaded into PC 100's memory) and in 503, PC 100 and its associated devices may be deemed to be in a Visual On state and fully functional. In 504, Module 200 may monitor PC 100 to determine if it is in transition to a Visual Off state. If it is not, then PC 100 continues to remain in the Visual On state. If, however, Module 200 determines in 504 that PC 100 is in transition, (e.g., the user has pressed the power button to turn PC 100 off and/or PC 100 is automatically configured for reduced power consumption while in Visual Off), then according to this embodiment, a copy of the system state (including information pertaining to audible and/or visual indicators on various HID devices that may be turned off to transition PC 100 to Visual Off) may be copied into to a location on PC 100 (e.g., PC 100's memory) in 505. In 506, the HID devices and portions of the Graphics Controller and/or Audio Adapter coupled to PC 100 may then be turned off. In one embodiment, the portions of the Graphics Controller and/or Audio Adapter that are turned off are the portions capable of performing graphics and/or audio computations to generate graphics and/or audio output to the display device and/or speaker(s).

Thereafter, if PC 100's configuration changes (e.g., the operating system sends messages to one of the devices that is turned off) in 507, then in 508, the respective driver (e.g., the Graphics Driver corresponding to the Graphics Controller and/or the Audio Driver corresponding to the Audio Adapter) may intercept these messages and update the system configuration information in PC 100's memory with one or more of these messages. In one embodiment, instead of the drivers, Module 200 may intercept these messages and update the system configuration information. If the configuration does not change, however, the system may remain powered down until the respective driver detects a request to transition the system to a Visual On state (e.g., the user has pressed the power button) in 509. If so, in 509, PC 100 transitions from a Visual Off state to a Visual On state and in 510, when the transition is complete, PC 100 and all its HID devices may be restored to their respective "on" states, and the device configuration information stored with the system state in PC 100's memory may be executed to update all the HID devices. Thereafter, PC 100 and all its HID devices will continue in a Visual On state.

Thus, in summary, the Visual Off state may be achieved in a variety of ways. As described above and illustrated in FIG. 4, in one embodiment, Visual Off may be achieved by intercepting communications from Operating System 250 to the various device drivers at 475. According to this embodiment, as described in further detail in relation to FIG. 2 above, Module 200 may instruct Display Device Driver 205 to change the state of Display Device 210 (e.g., to go from an ACPI "D0" to "D3" state), thus blanking the display. Graphics Controller 400 and Audio Adapter 425, however, may continue to process instructions from Operating System 250 (e.g., perform all computation to generate graphics and/or audio). In an alternate embodiment, as illustrated and described in relation to FIG. 4, in addition to Display Device Driver 205 blanking the display and Speaker Device Driver 235 muting the audio, portions of Graphics Controller 400 and Audio Adapter 425 (e.g., the portions that perform graphics and audio computations) may be turned off. Operating System 250 may interact with a portion of the graphics subsystem and the audio subsystem, which provides Operating System 250 with the illusion of interacting with Display Device 210 and Speakers 240. In reality, the drivers intercept and store at least one or more of the messages from Operating System 250 and the computation portions of Graphics Controller 400 and Audio Adapter 425 may remain off. In one embodiment, these stored messages are later executed to restore the HID devices to the states that Operating System 250 believes them to be in. This embodiment enables reduced power consumption while PC 100 is in Visual Off.

While PC 100 is in a Visual Off state, in one embodiment, it is critical that the audio and visual indicators that make the PC appear to be powered down remain in that state to retain the user's illusion that PC 100 is off. To accomplish this, in one embodiment, the operating system and/or other messages to the HID devices may be intercepted by Module 200 and not passed on to the devices. In an alternate embodiment, the messages to the HID devices may be altered by Module 200 prior to being passed on to the device. By intercepting the messages, Module 200 enables the operating system to continue thinking that the devices are operating. These messages may be intercepted in a variety of other ways without departing from the spirit of embodiments of the present invention.

Additionally, to ensure that PC 100 does not exit the Visual Off state by accident, i.e., for any reason other than the user depressing the power button, in one embodiment, Module 200 may be configured to recognize whether requests for the system to "wake up" originated from a power button press or from other device(s). Thus, for example, as previously described, while in Visual Off, the operating system may instruct PC 100 to transition from an "on" state to a lower power S3 or S4 state. If PC 100 receives a processing request while in an S3 or S4 state, it "wakes up" or transitions back to an "on" state. In one embodiment of the present invention, it is critical for Module 200 to recognize whether the "wake up" request originated from an application trying to execute on PC 100 (e.g., a request to start recording a television program on PC 100's hard disk, which requires PC 100 to transition from an S3 or S4 state to an "on" state), network traffic addressed to PC 100's Network Interface Card ("NIC") Media Access Control ("MAC") address, and/or a user pressing on a power button (i.e., a request to transition PC 100 to a Visual On state).

To maintain the illusion of PC 100 being "off," Module 200 may be configured to transition from Visual Off to Visual On only if the request originates from the power button (e.g., the user presses the power button to turn on PC 100). In contrast, if a device communicates with PC 100 while PC 100 is suspended or hibernating in Visual Off (e.g., PC 100 receives network traffic addressed to its NIC MAC address), or if an application on PC 100 is activated (e.g., to record a television program at 2 a.m.), Module 200 may be configured to recognize that although this communication is a "wake up" request to PC 100, it is not a request to transition PC 100 to a Visual On state. Thus, for example, in one embodiment, Module 200 may monitor various hardware components on PC 100 to determine the source of the "wake up" request. It will be readily apparent to those of ordinary skill in the art that this determination may be made in a variety of ways without departing from the spirit of embodiments of the present invention.

Embodiments of the present invention may be implemented on a variety of data processing devices. It will be readily apparent to those of ordinary skill in the art that these data processing devices may include various types of software, firmware and hardware. According to an embodiment of the present invention, the data processing devices may also include various components capable of executing instructions to accomplish an embodiment of the present invention. For example, the data processing devices may include and/or be coupled to at least one machine-accessible medium. As used in this specification, a "machine" includes, but is not limited to, any data processing device with one or more processors. As used in this specification, a machine-accessible medium includes any mechanism that stores and/or transmits information in any form accessible by a data processing device, the machine-accessible medium including but not limited to, recordable/non-recordable media (such as read only memory (ROM), random access memory (RAM), magnetic disk storage media, optical storage media and flash memory devices), as well as electrical, optical, acoustical or other form of propagated signals (such as carrier waves, infrared signals and digital signals).

According to an embodiment, a data processing device may include various other well-known components such as one or more processors. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. Similarly, an audio adapter may be coupled to the bridge/memory controller to control the output of audio to a speaker. The bridge/memory controller may be coupled to one or more buses. A bus host controller such as a Universal Serial Bus ("USB") host controller may be coupled to the bus(es) and a plurality of devices may be coupled to the USB. For example, user input devices such as a keyboard and mouse may be included in the data processing device for providing input data. The data processing device may additionally include a network interface (e.g., a network interface card and/or a modem) capable of coupling the device to a network (e.g., Network 150).

In the foregoing specification, the invention has been described with reference to specific exemplary embodiments thereof. It will, however, be appreciated that various modifications and changes may be made thereto without departing from the broader spirit and scope of embodiments of the invention, as set forth in the appended claims. The specification and drawings are, accordingly, to be regarded in an illustrative rather than a restrictive sense.

What is claimed is:

1. An article comprising a tangible machine-accessible medium having stored thereon instructions that, when executed by a machine, cause the machine to:
   configure the data processing device to recognize a visual on state and a visual off state,
      the visual on state comprising any mode in which the data processing device is processing data and responsive to requests; and
      the visual off state comprising a state identical to a visual on state except in that all user visible and user audible indicators of activity are turned off;
   identify a request to turn off the data processing device; and
   transition the data processing device to the visual off state by turning off all audible and visual indicators on the data processing device and on any human interface device ("HID device") coupled to the data processing device instead of turning off the data processing device.

2. The article according to claim 1 wherein the instructions, that, when executed by the machine, cause the machine to identify the request to turn off the data processing device by intercepting the request prior to receipt by an operating system on the data processing device.

3. The article according to claim 1 further comprising instructions, that, when executed by the machine, cause the machine to:
   identify a request to turn on the data processing device; and
   transition the data processing device from the visual off state to the visual on state.

4. The article according to claim 3 wherein the instructions, that, when executed by the machine, cause the machine to transition the data processing device from the visual off state to the visual on state by turning on the audible and visual indicators on the data processing device and on the any HID device coupled to the data processing device.

5. The article according to claim 1 wherein the request to turn off the data processing device is generated by one of a power button on the data processing device, a button on a display coupled to the data processing device, a predefined key on a keyboard coupled to the data processing device and a button on a remote control device coupled to the data processing device.

6. The article according to claim 1 wherein the request to turn off the data processing device is generated automatically based on input from one or more devices coupled to the data processing device.

7. The article according to claim 1 wherein the request to turn off the data processing device is generated automatically upon expiration of a predetermined period of inactivity.

8. The article according to claim 1 wherein the any HID device coupled to the data processing device includes at least one of one or more display devices, a keyboard, a mouse and a speaker.

9. The article according to claim 1 wherein the instructions, that, when executed by the machine, cause the machine to transition the data processing device to the visual off state by transitioning the data processing device to a low power state upon receiving an instruction to do so from an operating system on the data processing device.

10. The article according to claim 1 wherein the instructions, that, when executed by the machine, cause the machine to transition the data processing device to the visual off state by turning off a computation process that generates output to the any HID device.

11. The article according to claim 10 wherein the any HID device is a display device and turning off the computation process that generates output to the display device further includes instructions, that, when executed by the machine, cause the machine to:

turn off a portion of a graphics controller capable of performing graphics computations;

intercept messages from an operating system to the graphics controller, and store at least one of the messages from the operating system to at least one location.

12. The article according to claim 11 wherein the at least one location includes at least one of a memory and a hard disk.

13. The article according to claim 11 further comprising instructions, that, when executed by the machine, cause the machine to:

turn on the audible and visual indicators on the display device;

turn on the portion of The graphics controller capable of performing graphics computations; and execute the at least one of the messages from the operating system stored in the at least one location on the data processing system.

14. The article according to claim 10 wherein the any HID device is a speaker and turning off the portion of the computation that generates output to the speaker further comprises instructions, that, when executed by the machine, cause the machine to:

turn off a portion of an audio adapter capable of performing audio computations;

intercept messages from the operating system to the audio adapter, and store at least one of the messages from the operating system to at least one location.

15. The article according to claim 14 further comprising instructions, that, when executed by the machine, cause the machine to:

turn on the audible and visual indicators on the speaker;

turn on the portion of the audio adapter capable of performing audio computations; and execute the at least one of the messages from the operating system stored in the at least one location.

\* \* \* \* \*